United States Patent

[11] 3,632,081

| [72] | Inventor | Jack Evans<br>Baltimore, Md. |
|---|---|---|
| [21] | Appl. No. | 27,340 |
| [22] | Filed | Apr. 10, 1970 |
| [45] | Patented | Jan. 4, 1972 |
| [73] | Assignee | The United States of America as represented by the Administrator of the National Aeronautics and Space Administration |

[54] SOLENOID VALVE INCLUDING GUIDE FOR ARMATURE AND VALVE MEMBER
7 Claims, 2 Drawing Figs.

[52] U.S. Cl..................................................... 251/129, 251/333
[51] Int. Cl..................................................... F16k 31/06
[50] Field of Search.......................................... 251/129, 139, 77, 333, 334

[56] References Cited
UNITED STATES PATENTS

| 3,074,685 | 1/1963 | Eckert et al. ................. | 251/129 X |
| 2,603,446 | 7/1952 | Harding........................ | 251/334 |
| 2,645,449 | 7/1953 | Gulick.......................... | 251/334 |
| 3,285,285 | 11/1966 | Bielfield....................... | 251/139 X |
| 1,333,681 | 3/1920 | Riley............................ | 251/129 X |

*Primary Examiner*—Arnold Rosenthal
*Attorneys*—R. F. Kempf, N. B. Siegel and John R. Manning

ABSTRACT: The poppet of a valve is guided independently of an activating armature. The poppet is linked to the armature through a nonmagnetic spring biasing mechanism. The spring biasing mechanism has a plunger which is inserted into a cone-shaped cavity in the poppet. A guiding member guides both the armature and the poppet independently of one another. The spring biasing mechanism causes the poppet to make contact with a valve seat before the armature completes its stroke to reduce the impact force. In addition, the valve seat and the poppet have unique contour shapes which are designed to reduce stresses.

PATENTED JAN 4 1972

3,632,081

INVENTOR
JACK EVANS

BY *Neil B. Siegel*
ATTORNEYS 3,632,081

SOLENOID VALVE INCLUDING GUIDE FOR ARMATURE AND VALVE MEMBER

ORIGIN OF THE INVENTION

The invention described herein was made by an employee of The United States Government and may be manufactured and used by or for The Government for governmental purposes without the payment of any royalties thereon or therefore.

BACKGROUND OF THE INVENTION

This invention relates generally to the art of fluid valves. More particularly, it relates to closure systems that are particularly useful in solenoid actuated valves.

Solenoid actuated valves are frequently used to regulate fuel flow to propulsion engines of aircraft and spacecraft. Preferably, such valves should operate reliably for at least 3,000,000 cycles with an extremely low leakage rate. However, prior art valves do not have the high degree of reliability needed to function for three million cycles without creating an intolerable amount of leakage.

In normal valves of the type with which this invention is concerned, fluid flows through a bore when the valve is opened. To close the valve, a closure member, commonly called a poppet, is pressed against the mouth of the bore, commonly called a valve seat. Many valves are solenoid actuated by attaching the poppet to the armature of a solenoid coil. Also, many solenoid valves are designed to be closed when the solenoid is not energized and to be opened when the solenoid is energized. When solenoid valves are so designed, the armature is spring biased so as to urge the poppet against a valve seat when the valve is closed. To open the valve, the solenoid is energized, thus pulling the magnetic armature and its attached poppet away from the valve seat. When the solenoid is thereafter deenergized, the spring bias slams the armature and its attached poppet against the valve seat, thus, closing the bore through which fluid is flowing.

In most prior art solenoid valves, movement of the armature is along a definite tract which holds the poppet in registration with the valve seat. An example of such a prior art device is shown in U.S. Pat. No. 2,296,132 issued to Wiseley for a "Magnetic Check and Release Valve." One primary difficulty with such a valve is that the magnetic center of the solenoid coil and its armature are generally not in the center of the track along which the armature travels. This dislocation creates a radical force which urges the armature away from its tract. The slight radial force, together with normal operating clearances between the armature and it's guiding means, causes the armature to operate continually on one side of its tract. Thus, the armature and its attached poppet are forced out of registration with the valve seat and a leaky valve results. It is an object of this invention to overcome this magnetic bias problem.

Another difficulty with prior art solenoid operated valves is that they tend to deform and damage the valve seat due to the forces developed during closing. That is, the armature and other moving parts develop a momentum force upon closing which must be absorbed by the valve seat. This force tends to deform and damage the valve seat. Hence, it is also an object of this invention to prevent excessive dynamic loading on the valve seat so as to minimize deformation damage.

Because the stress levels on valve seats in prior art valves are too high, they do not operate reliably for at least three million cycles. Rather, the valve seats are damaged by repeated off center blows of the closure member causing fatigue failure of the valve seat surface, thus, creating a leak path. Hence, it is yet another object of this invention to reduce the working stresses in a valve seat to a level well below the fatigue limit of the valve seat material.

Stresses in valve seats of many prior art valves are also increased by sharp corners and thin cross sections. Therefore, it is yet another object of this invention to provide a valve seat and a poppet having a reduced number of sharp corners and a thick cross section thereby creating a minimum amount of stress in the valve seat.

SUMMARY OF THE INVENTION

In my invention, the poppet is guided independently of the armature. If the armature is pulled to one side of its track by an off-center magnetic field, the poppet is unaffected because it is isolated from the armature by a separate guidance track.

A floating spring system further reduces loading on the valve seat in my invention. The floating spring system accomplishes this by isolating the valve seat impact of the lightweight poppet from that of the heavy armature.

In order to reduce loading on the valve seat even further, I have designed unique shapes for the facings of a poppet and its counterpart valve seat.

Experimentation has shown that the valves of this invention operate reliably in excess of three million cycles with little or no leakage. This startling result is achieved by a combination of the several unique features.

BRIEF DESCRIPTION OF THE DRAWINGS

The foregoing and other objects, features, and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

DESCRIPTION OF THE PREFERRED EMBODIMENT

Figure 1:
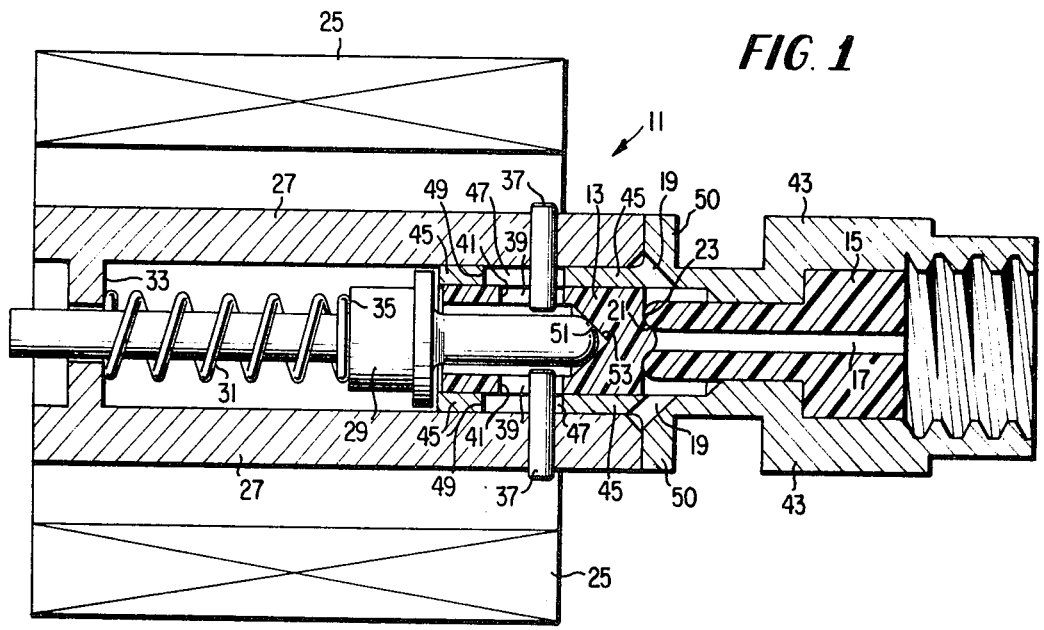
FIG. 1 is a cutaway view as seen along a longitudinally bisecting plane of a valve employing the features of this invention.

Referring now to the drawings and more particularly to FIG. 1, there is shown a solenoid-actuated valve designated generally by numeral 11. The valve 11 has a closure member 13, commonly called a poppet, and a valve seat 15. The poppet and valve seat are constructed of a suitable resilient material, for example, trifluorochloroethylene polymer, a resilient plastic, is used in one embodiment. The flow of fluid through the illustrated valve is through an axial valve seat bore 17 and guide member bores 19.

As shown in FIG. 1, the poppet face 21 is pressed against the valve seat face 23. In this position, the valve 11 is closed because the poppet 13 prevents fluid from flowing through the valve seat bore 17. To open the valve 11, the poppet 13 is moved to the left away from valve seat 15. This movement of the poppet opens bore 17. A solenoid coil 25, acting on a tubular shaped magnetic armature 27, supplies the energy that moves the poppet 13 away from the valve seat 15.

A linkage between the armature 27 and the poppet 13 is provided by a nonmagnetic plunger 29 and its related components. More specifically, a biasing spring 31, formed of a nonmagnetic material, impinges at one end of an inner shelf 33 formed on the tubular armature 27. The other end of the coil spring 31 impinges on a collar 35 forming a part of the plunger 29. Because the coil spring 31 is biased between the armature 27 and the plunger 29, it urges the plunger 29 against the poppet 13 so as to hold the poppet against the valve seat 15 as shown in FIG. 1. More specifically, the plunger 29 has a rounded tip 51 that presses against a conically shaped recess 53 in the poppet thereby pressing the poppet against the valve seat. A pair of pins 37 extend from the armature 27 through slots 47 in a tubular shaped guide member 45 located between the poppet and the armature, and through slots 39 in the poppet 13. When the solenoid coil 25 is energized so as to force the armature 27 to the left, the pins 37 contact the ends 41 of the slots 39 in the poppet 13. As the armature 27 continues to move to the left, the pins 37 pull the poppet 13 away from the face 23 of the valve seat 15.

The valve seat 15 is embedded in poppet guide 43 which is held firmly in a fixed position, thereby allowing the previously described valve opening poppet movement. The poppet guide 43 includes the previously described tubular shaped guide member 45 in which the slots 47 have been cut. As can be seen in FIG. 1, the poppet 13 is slideably held inside of the tubular guide member 45 and the tubular shaped armature 27 is slideably mounted outside of the guide member 45.

The invention operates as follows: the armature 27 is biased by any suitably biasing mechanism (not shown) against a forward armature stop 50 formed as a collar on the poppet guide 43. In this position, the biasing spring 31 urges the plunger 29 rightwardly as viewed in FIG. 1 so as to press the poppet 13 against the face 23 of the valve seat. In this position, the valve is closed.

Upon energizing the solenoid coil 25, the magnetic armature 27 is pulled to the left, away from the forward armature stop 50. When the armature 27 first begins to move, the pins 37 move freely in the slots 39 and 47, in the poppet and the poppet guide, respectively. The poppet 13 continues to be urged against the valve seat 15 until the pins 37 make contact with the ends 41 of the slots 39 in the poppet. At this point, the pins 37 pull the poppet 13 with them as they continue to travel to the left. Armature travel continues until the pins 37 contact the ends 49 of the slots 47 in the poppet guide. It should be noted that during the described movement of the poppet 13, it is guided by the guide member 45 of the poppet guide 43 independently of the armature 11. Hence, while deformities in the magnetic field may urge the armature 27 in radial direction, the poppet 13 is not so urged.

When the solenoid coil 25 is deenergized, the biasing spring (not shown) urges the armature 27 to the right toward the forward armature stop 50. Before the armature 27 reaches the forward armature stop 50, the poppet 13 makes contact with the valve seat 15. At this point the biasing coil spring 31 biases the poppet 13 against the valve seat 15 and decelerates the armature 27 as it comes to rest against the forward armature stop 50. The loading on the valve seat 15 is reduced considerably by this floating spring action of the poppet 13. Also, the impact of the armature 27 against the forward armature stop 50 is decreased considerably by the decelerating action.

It can be appreciated by those skilled in the art that this invention overcomes many difficulties existing in the prior art. That is, because the poppet 13 is not pulled to one side by a slightly deformed magnetic field good registration results regardless of the form of the magnetic field. More specifically, continual "off center" striking of the valve seat by the poppet is virtually eliminated. Also, load stress in the valve seat 15 caused by impact with the poppet 13 is thereby reduced. Further, the heavy weight of the armature 27 does not drive the poppet 13 against the valve seat, thus further stress in the valve seat is eliminated and "locking" of the poppet against the valve seat is prevented.

Figure 2:
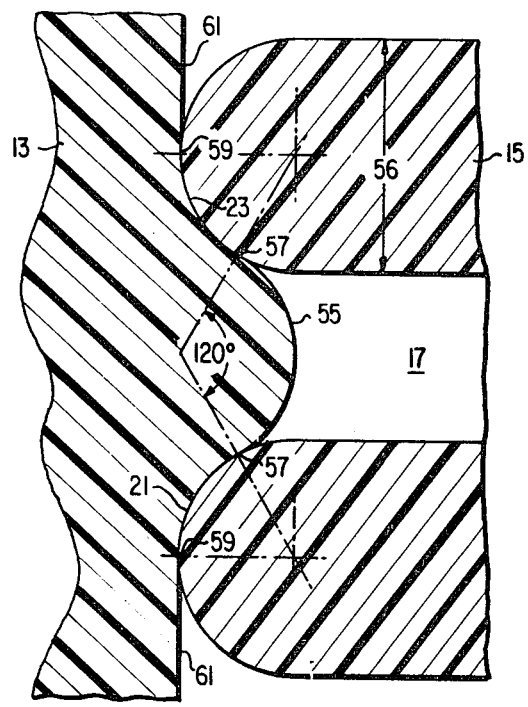
FIG. 2 is an enlarged view of a part of FIG. 1 showing in more detail the contours of the valve seat and poppet faces.

In order to reduce stresses in the valve seat 15 even more, the poppet face 21 and the valve seat face 23 have unique contour shapes. These shapes can best be seen in FIG. 2, which is an enlarged view of the valve seat portion of FIG. 1. The poppet is again designated by numeral 13, the valve seat by numeral 15, and the valve seat bore by numeral 17.

The valve seat face 23 is formed at the left end of the tubular shaped valve seat 15. It can be seen in FIG. 2 that the end of the valve seat wall is rounded so as to form a semitoroidal valve seat face 23. The wall thickness 56 of the tubular valve seat 15 is large relative to the diameter of the valve seat bore 17. This thickness provides a large surface area on the valve seat face 23 for contacting the poppet. Preferably, the valve seat wall thickness 56 is at least twice as great as the diameter of the valve seat bore 17.

The poppet face 21 has a semispherically shaped protrusion 55 which is inserted in the bore 17 when the valve 11 is closed. The spherical surface of the protrusion 55 shares a common tangent surface with the toroidal seat face 23 at a tangent circle 57. The shape of the poppet face 21 follows the contour of the toroidal seat face 23 from the tangent circle 57 to a separation circle 59. At the separation circle 59 the poppet face 21 becomes a plane 61 which is tangent to the seat face 23. The spherical protrusion 55 acts as a guide for the poppet 13 by finding the bore 17. Protrusion 55 also gives additional support to the valve seat 15 when the valve is closed. That is, when the valve is closed, there is fluid pressure tending to collapse the mouth of the valve seat 15. The protrusion 55 provides support to the inside of the seat face 23 to counteract the outside fluid pressure.

In operation, when the poppet 13 first contacts the valve seat 15, the resilient valve seat yields, thus allowing more surface of the tangent plane 61 of the poppet face 21 to come in contact with the valve seat face 23. Once the initial impact is passed, the resilient valve seat 15 will return to its original shape and the tangent surface 61 will come out of contact with the poppet face 21. By eliminating sharp corners and small contact areas, stresses in the valve seat 15 are reduced and its life is prolonged.

While the invention has been particularly shown and described with reference to a preferred embodiment, it will be understood by those skilled in the art that various changes in form and detail may be made therein without departing from the spirit and scope of the invention.

What is claimed is:

1. A solenoid valve comprising:
   a valve seat;
   a valve closure member;
   actuating means for pressing said valve closure member against said valve seat and pulling said valve closure member away from said valve seat, said actuating means including:
   a solenoid,
   an armature, and
   a nonmagnetic spring bias means which cooperates with said armature and said valve closure member to cause said valve closure member to make contact with said valve seat before said armature completes its movement toward said valve seat upon closing said valve, to bias said valve closure member against said seat when said valve is closed, and to decelerate the movement of said armature after said valve is closed; and
   hollow guiding means having an outside guidance track and inside guidance track for guiding, respectively, said armature and said valve closure member, the latter into registration with said valve seat.

2. A valve as in claim 1 wherein:
   said nonmagnetic spring bias means includes a plunger which pushes against said closure means when said valve is closed; and, said valve closure member has a cone shaped cavity into which said plunger is inserted when pushing against said closure means.

3. A valve as in claim 2 wherein:
   said valve seat has a face at one end, said face having a semitoroidally shaped portion; and,
   said closure member has a face which has a semispherically shaped portion which protrudes into said semitoroidally shaped portion and has a common tangent surface with said semitoroidally shaped portion when said valve is closed.

4. A valve as in claim 1 wherein said hollow guiding means is tubular in shape and wherein said outside tract and said inside track of said guiding means, the inner surface of said armature, and the outer surface of said valve closure member are all coaxial.

5. A valve as in claim 2 wherein said valve closure member and said armature are both tubular in shape, and said armature has an inner member perpendicular to the longitudual axis of said armature, with said inner member having a central aperture therein; and wherein said nonmagnetic spring bias means further includes a shaft portion extending through said aperture, a collar member attached to and between said shaft and said plunger, a spring member coiled about said shaft portion having one end resting against said inner member of said armature and the other end resting against said collar member.

6. A valve as in claim 5 wherein said armature has a pair of pins extending inwardly thereof and said guiding means and valve closure member both have slots therein for cooperating with said pair of pins.

7. A valve as in claim 4 wherein said hollow guide means also includes a central track for retaining and positioning said valve seat in alignment with said closure member.

* * * * *